US008547223B2

(12) United States Patent
Midtun et al.

(10) Patent No.: US 8,547,223 B2
(45) Date of Patent: Oct. 1, 2013

(54) SYSTEM AND METHOD FOR LOCATION DETECTION AND MANAGEMENT OF UNCERTAIN INFORMATION THEREOF

(75) Inventors: James D. Midtun, Chandler, AZ (US); Thomas A Gray, Mansfield (CA)

(73) Assignee: Mitel Networks Corporation, Ottawa Ontario (CA)

( * ) Notice: Subject to any disclaimer, the term of this patent is extended or adjusted under 35 U.S.C. 154(b) by 666 days.

(21) Appl. No.: 12/587,668

(22) Filed: Oct. 10, 2009

(65) Prior Publication Data

US 2011/0084832 A1    Apr. 14, 2011

(51) Int. Cl.
*G08B 1/08* (2006.01)

(52) U.S. Cl.
USPC .................................. 340/539.13; 455/456.1

(58) Field of Classification Search
USPC ................... 340/8.1; 702/94; 342/450, 451; 455/456.1, 457
See application file for complete search history.

(56) References Cited

U.S. PATENT DOCUMENTS

| | | | |
|---|---|---|---|
| 7,058,167 B2 | 6/2006 | Gray et al. | |
| 7,415,104 B2 | 8/2008 | Gray et al. | |
| 2003/0008672 A1* | 1/2003 | Fujii | 455/456 |
| 2005/0273291 A1 | 12/2005 | Zukowski et al. | |
| 2006/0152404 A1* | 7/2006 | Fullerton et al. | 342/28 |
| 2007/0008129 A1* | 1/2007 | Soliman | 340/572.1 |
| 2007/0126634 A1* | 6/2007 | Bye | 342/451 |
| 2007/0241965 A1* | 10/2007 | Kolavennu et al. | 342/465 |
| 2009/0051559 A1* | 2/2009 | Wu et al. | 340/666 |
| 2010/0250727 A1* | 9/2010 | King et al. | 709/224 |

FOREIGN PATENT DOCUMENTS

| | | |
|---|---|---|
| CA | 2550812 A1 | 12/2006 |
| EP | 2077473 A1 | 7/2009 |
| GB | 2345822 A | 7/2000 |
| WO | WO 03/090174 A1 | 10/2003 |

OTHER PUBLICATIONS

Gray et al. "Context and Intent in Call Processing"; Feature Interactions in Telecommunications and Software Systems VII; 2003, pp. 177-184; IOS Press, Amsterdam.
Bradner et al. "Babble: Supporting Conversation in the Workplace", Designing Virtual Communities for Work; 1998, CSCW 98 Workshop.
Winograd, Terry "A Language/Action Perspective on the Design of Cooperative Work" Human-Computer Interaction 3:1; 1987-88, pp. 3-30.

\* cited by examiner

*Primary Examiner* — Thomas Mullen

(57) ABSTRACT

The system provides approximations of a person's location to interested parties wherein the approximations are based upon a detection device's location and inherent inaccuracies related to that detection device. The system can evaluate location information from multiple detectors and approximate the location using and combining that information. The system can provide a confidence level for that determination. The system can also degrade confidence levels assigned to the location as a function of time. Each location can include a hierarchy of subtypes with each subtype including a precision level, the precision level associated with an accuracy level of a detector involved for placing a person within that particular location. When a detector receives location information, the system described herein can traverse through the locations and their associated precision levels to approximate the correct type of location within the hierarchy using the accuracy level of the detector.

15 Claims, 8 Drawing Sheets

SYSTEM AND METHOD FOR LOCATION DETECTION AND MANAGEMENT OF UNCERTAIN INFORMATION THEREOF

FIELD OF INVENTION

This application generally relates to location determinations, and more particularly, to a system and method for providing approximations of a person's location to a number of interested parties wherein the approximations are based upon inherent uncertainties related to detection devices.

BACKGROUND OF THE INVENTION

Every day, millions of people log in to their computers using an associated password and username. By logging in and using such personalized information, the presence or absence of the person at a computer terminal can be determined. In addition, presence or absence of a person can be determined through a phone system. For instance, calls made by a person can be used to automatically detect presence of the caller's location.

Because these detection devices have limited ranges, however, other devices have been used for locating a person of interest. Motion sensor systems, through infrared technology, can determine the presence or absence of a person by detecting movements within a limited range. Global positioning systems (GPS), often provided in many cell phones, can also be used to determine the location of a person. Through these global positioning systems, latitude, longitude, and even the elevation of the person can be determined. In other applications, a wireless fidelity (WiFi) detector can be used. While providing a greater area for detection, these detectors often provide uncertain and ambiguous information.

Recently, "availability" features were introduced into presence and absence determination systems. Availability features provide the user with options describing their current status. Namely, a user could be "unavailable," "available," "busy," "in a meeting," "on a call," etc. As an illustrative example, systems would consider a user "unavailable" if the computer system failed to detect mouse or keyboard movements for a prolonged period of time. Systems were also programmed to go "busy" when associated applications, such as electronic calendars, indicated so. By using the availability feature, other parties interested in the whereabouts of the user would be able to check the user's status.

Nevertheless, these systems did not take into account detectors such as the GPS and WiFi detector as provided above and were only related to determining whether the person of interest was within the immediate area. Furthermore, previous systems did not handle estimated locations in which a person can be found. These previous systems did not provide ways to identify locations in a manner which were suited to policies and applications that were applicable to various forms of human interaction. In addition, previous systems did not allow locations for the various forms of human interaction to propagate in a manner such to be combined with the various other forms of human interaction to provide a more deterministic result. Therefore, a need exists to provide a location detection and management system which can account for uncertainties provided by detectors as well as overcoming limitations present within today's systems.

BRIEF DESCRIPTION OF THE DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

Figure 1:
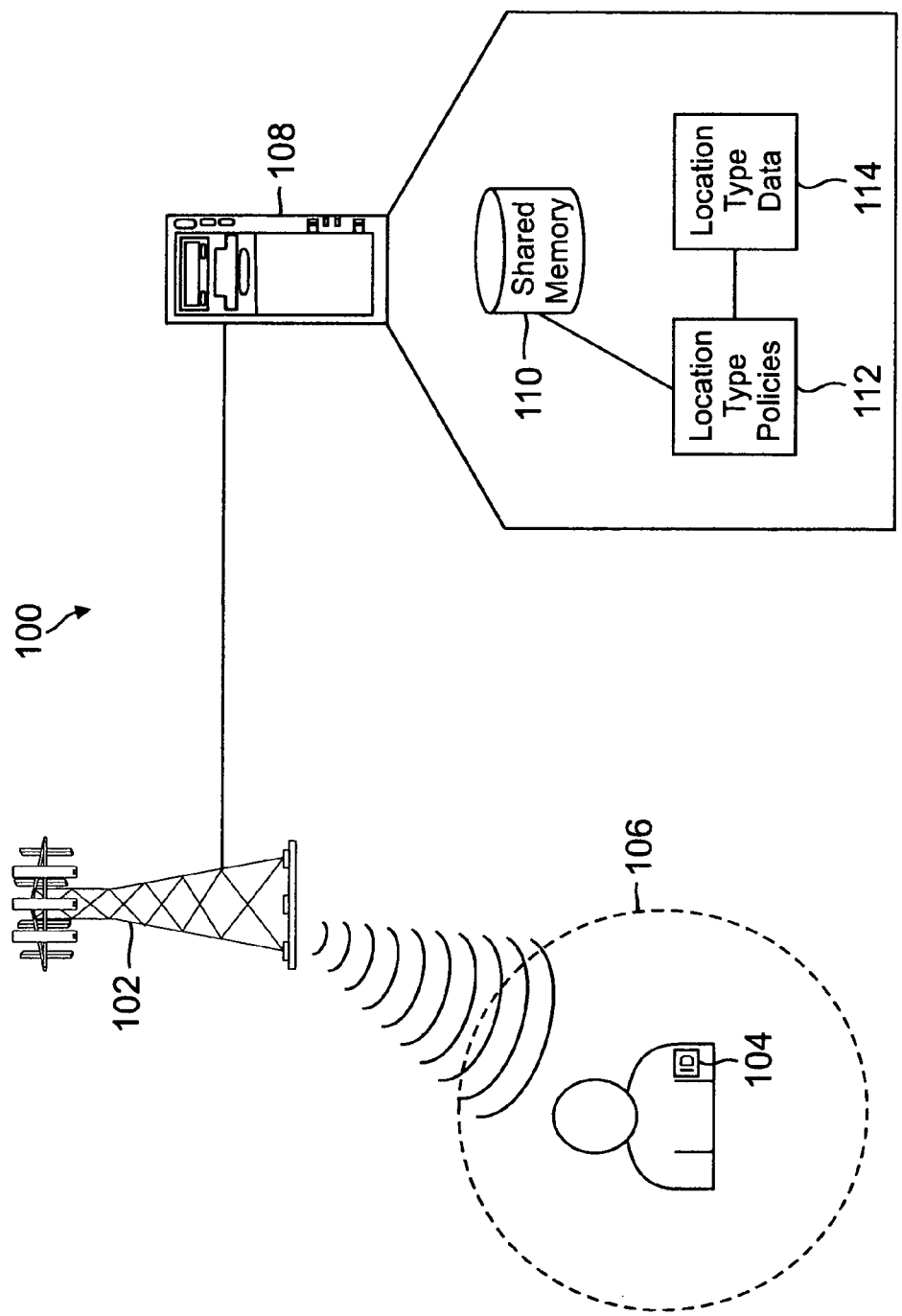
FIG. 1 depicts a pictorial illustration of an exemplary system for detecting a person within a range of a detector in accordance with one aspect of the present application.

The description set forth below in connection with the appended drawings is intended as a description of presently-preferred embodiments of the application and is not intended to represent the only forms in which the present application may be constructed and/or utilized. The description sets forth the functions and the sequence of steps for constructing and operating the application in connection with the illustrated embodiments. It is to be understood, however, that the same or equivalent functions and sequences may be accomplished by different embodiments that are also intended to be encompassed within the spirit and scope of this application.

Overview

Generally described, the present application relates to an integrated system, and more particularly, to a system and method for providing approximations of a person's location to a number of interested parties wherein the approximations are based upon inherent inaccuracies related to a detection device. In one illustrative embodiment, a set of locations such as country, state, city, building, and room can be placed in a hierarchy. Each location within the hierarchy can include a precision level, the precision level associated with an accuracy level of a detector involved for placing a person within that particular location. Typically, the broader the location, the lower the accuracy level of a detector for placing a person within that location and similarly, the more specific the location, the higher the accuracy level for placing a person within that location.

When a detector receives location information, the system can traverse through the locations and their associated precision levels to approximate the correct type of location within the hierarchy using the accuracy level of the detector that received the location information. For example, a wireless fidelity (WiFi) detector can have an accuracy level for approximating a person's location within a country, state, city, and building based on its precision levels, but does not have an accuracy level for determining whether the person is within a room. In turn, an associated management device could receive information corresponding to those approximations to provide centralized information where distribution of that information to a number of devices operated by interested parties can take place.

In essence, the system presented herein discloses a system that receives and analyzes sensor data and creates estimations about a user location. Due to the inherent inaccuracies of sensor readings and detection devices, locations can be associated with a confidence value that can show that a person is within the location. As will become apparent from the following description, multiple embodiments for the present application are presented and are not limited to the illustration provided above. In one embodiment, the system can evaluate location data from multiple detectors and approximate the location using and combining that information. In other embodiments, the system can determine a location of a person and provide a confidence level for that determination. In another embodiment, the system can also degrade confidence values assigned to the approximation as a function of time. In other embodiments, the system can determine a location of a person and provide a confidence level for that determination. In one embodiment, the system can analyze ambiguous location information. The above embodiments represent a small set of applications in which the system can be used. One skilled in the relevant art will appreciate that the present application can be extended to multiple embodiments beyond those described above.

Location Types and Subtypes

Integrated into the system can be Location Types that are used to evaluate location information, the Location Types being suited for various forms of interaction. Syntaxes and semantics can be used for the Location Types. With relation to the present application, but not limiting hereto, syntax can refer to principles and rules for constructing a Location Type. As will be shown, Location Types can include multiple syntaxes, each of which can be suited to different interaction spaces. Semantics can refer to, but is not limited to, policies for linking various Location Types.

A Location Type can be a simple parameter. The simple parameter can be associated with a simple numeric quantity or value. In the alternative, and as will be described within the present application, the Location Type can be multifaceted. Location Types typically describe the location of a person in such a way to effectively manage interaction and thus enable effective collaboration with such information. One skilled in the relevant art will appreciate that one Location Type can be preferred over another Location type dependent on the type of application that uses the Location Type. For example, one Location Type, a Political/Physical Location Type, can describe a general location, while another Location Type, an Enterprise Location Type, can be used for an employer/employee/visitor relationship. Other Location Types can include, but are not limited to, a Raw Sensor Data Location Type and a User/Social Location Type. In one exemplary embodiment, the Location Types can include the following:

```
<Raw Sensor>
<Political/Physical>
<Enterprise>
<User/Social>
```

Generally, each Location Type can include a number of Subtypes. The Subtypes can be hierarchically categorized by means of aggregation and specialization. A specific location can be described in the syntax of the Subtypes at each level in the hierarchy. To better exemplify Subtypes, each Subtype for each Location Type can be defined by the following:

```
<Raw Sensor>
<Political/Physical>
    <<Country>>
    <<City>>
    <<District>>
    <<Street>>
    <<Building>>
    <<Floor>>
    <<Room>>
<Enterprise>
    <<Premises>>
    <<Campus>>
    <<Building>>
    <<Room>>
<User/Social>
    <<Venue>>
    <<Building>>
    <<Room>>
```

As shown above, but not limiting the present application, Raw Sensor Location Type does not include Subtypes. Political/Physical Location Type can include Country Subtype, City Subtype, District Subtype, Street Subtype, Building Subtype, Floor Subtype, and Room Subtype. Enterprise Location Type can include Premises Subtype, Campus Subtype, Building Subtype, and Room Subtype. User/Social Location Type can include Venue Subtype, Building Subtype, and Room Subtype. It will become apparent to one of ordinary skill in the art the uses and features of each of the Location Types and Subtypes from the discussion below.

In some embodiments, Subtypes of the Location Types can be restricted to a certain set or range of values. In the Physical/Political Location Type, for example, the Room Subtype can be restricted with room numbers used in the building. In another example, using the Enterprise Location Type, the Premises Subtype can be restricted to the values of "On" or "Off" representing policies that can affect employees differently if they are "On" or "Off" company premises. The Campus Subtype and Building Subtype can also be restricted to a specific list of real estate properties that are used for company operations. In the Enterprise Location Type, it could be useful to provide more functional values. For example, these could include: Office, Meeting Room, Hallway, Stairs, Male Dressing Room, and Female Dressing Room.

Within the User Location Type, Venue Subtype can take the values of "Work" or "Home" to indicate two distinct environments in which communication and collaboration features can be expected to function differently. The Room Subtype can take values in the form of Office, Boss's Office, Meeting Room, Dressing Room, etc. The syntax for the Location Types can be created such that the instantiated Location Types can be of use for further applications and policies.

In typical embodiments, Enterprise Location Types can apply policies to the location of employees and visitors within its premises. For example, through the Enterprise Location Type, the system can determine whether an employee is present for work or that a visitor has moved into a restricted area. In another example, the User Location Type can have policies that modulate their communication features to handle their calls differently if they are in their own office as differentiated from when they are in the office of a colleague. One skilled in the relevant art will appreciate that there can be a number of different syntaxes to describe different Location Types. Furthermore, numerous Subtypes can also be associated with the Location Types.

The User Location Type can be created with a syntax that would specify locations in a way that could be useful for further policies and applications. The User Location Type can be used to indicate suitable forms of human interaction i.e., indicating behaviors of users. In one example, a user in a meeting room can have their call forwarding operate differently than if they were in their own office.

As depicted above, the Enterprise Location Type and the User Location Type show that the concept of a Location Type can extend beyond the typical Political/Physical Location Type. Generally, the Location Type does not simply denote a point in space, but can be extended to spaces of interaction between enterprises and people as they collaborate for business and social purposes. One skilled in the relevant art will appreciate that the concept of Location Types is not limited to those specifically provided within the present application. Furthermore, numerous applications of the Location Type can be derived from those syntaxes expressed above.

With specific reference to the Political/Physical Location Type, the aggregation hierarchy is explained in more detail now. As recited above, the Political/Physical Location Type can include Country Subtype, City Subtype, District Subtype, Street Subtype, Building Subtype, Floor Subtype, and Room Subtype. In one example of the aggregation, the Floor Subtype incorporates one or more Room Subtypes. In addition, the Floor Subtype can incorporate a Hallway Subtype.

In some embodiments, the Subtypes can be specialized. For example, the Building Subtype can include a specialized value of "Residence" or "Business" premises. The Room Subtype can be specialized into office, meeting room, dressing room, etc. The dressing room can further be specialized into male and female dressing rooms. The specialization can continue as far as it is valuable to the syntax of the Location Type. Through the syntax described above, various Location Types can be instantiated.

Using the concepts provided above, Location Types can be instantiated to facilitate the management of location data. As will be shown below, the Location Type can be instantiated from location data received from a detector. Typically, the location data can be stored within the Location Type Data, which will be further described below. For example, an instantiation of the Political/Physical Location Type can be:

```
<Political/Physical>
    <<Country>><<United States>>
    <<City>><<New York City>>
    <<District>><<Midtown Manhattan>>
    <<Street>><<34th Street>>
    <<Building>><<Empire State Building>>
    <<Floor>><<56th>>
    <<Room>><<56123>>
```

As shown, the use of a hierarchy allows the creation of a syntax for the representation of a location. The syntax could represent a location as a sequence of ordered pairs, key/value pairs, otherwise known as a tuple. Tuples can be stored in computer memory for access by other applications.

One skilled in the relevant art will appreciate that the representation of a location described above is not intended to be complete. For example, the Political/Physical Location Type does not indicate a position within a room. Rather the scope of the present application is intended to define a location such that it can be useful for subsequent applications. The scope of the present application is intended to define illustrative Location Types and Subtypes that could provide location information for many applications.

Interaction Between Multiple Location Types

The examples provided above described exemplary syntaxes for the Location Types and Subtypes. Associated with the syntaxes can be a set of semantics, which define policies within Location Types and between multiple Location Types. Often, having policies for those Location Types can enhance communication and collaboration applications.

As shown above, a Physical/Political Location Type can be instantiated from location data. Similarly, the Enterprise Location Type and User Location Type can be derived from the same location data. In one embodiment, however, Location Types can use the data within other instantiated Location Types to fill in their own instantiation. In another embodiment, multiple Location Types can be used to pinpoint a more precise location of a person. For example, the instantiated Enterprise Location Type can place a person within a campus to a certainty. In addition, the Political/Physical Location Type can place a person within a room to a certainty. Using both the Enterprise Location Type and the Political/Physical Location Type, the person can be placed within their own office of the campus to a degree of confidence that is derived from the confidences of the Enterprise Location Type and the Political/Physical Location Type.

As illustrated, the confidence in Location Types that are derived from other Location Types can be derived from the confidences within these Location Types. In addition, policies in the new Location Types can take information from their Location Type Data to improve confidence levels for the new types. In one example of the semantics provided by the present application, the Political/Physical Location Type can place a person in one of six rooms. If the Enterprise Location Type includes Location Type Data that indicates that one of these rooms is a utility room that is off limits, then the system can sharpen its confidence declarations that have been provided by the Physical/Political Location Type.

In another example of semantics that can govern Location Types, if the system is aware that a person is a female and one of the rooms is a male dressing room for the Enterprise Location Type, then the confidence declarations can be further refined. Location placements can also be refined by placing a person within their own office rather than a colleague's.

Confidence refinement policies can also be used in conjunction with a calendar feature. This can affect a person's likelihood of being at any one place dependent on information provided within a calendar. While several semantics or policies were provided above, one skilled in the relevant art will appreciate that there are numerous ways to combine the different location types and subtypes. In addition, there are a variety of variables and features that can be used to approximate a person's location through the syntax described above.

Accuracy

In the present application, and with reference now to FIG. 1, the system 100 described herein relates to approximating a person's location, and in typical embodiments, using the syntaxes and semantics described above. For illustrative purposes, a general location like "Work" or "Chandler Office"

can be given a low precision level and a specific location like "Cubicle" could be given a higher precision level. The system 100 could then determine which set of locations it can detect based on how accurate the information is that is received from the detector 102. For example, a phone having WiFi, instead of a global positioning system (GPS), could receive less accurate data causing the system 100 to differentiate only between work and home, but not individual offices or conference rooms.

As shown, the exemplary system 100 can include a detector 102, an optional location device 104, a range of uncertainty 106, and a server 108. The server can include a shared memory 110, Location Type Policies 112, and Location Type Data 114. These components are understood by one skilled in the relevant art to be illustrative and not to be construed as limiting to the present application. The system 100 described in FIG. 1 provides a single detector 102, but as will be shown below, the system 100 can include multiple types of detectors 102, which can include, but is not limited to, light detectors, motion detectors, temperature detectors, magnetic field detectors, vibration detectors, pressure detectors, sound detectors, etc.

In some embodiments, a location device 104 can be used to identify a person to a detector 102. Examples of such location devices 104 can include a key card, an identification badge, or some other type of technology that can be used to alert the detector 102. Often, these types of devices 104 can use infrared technology.

Generally described, precision levels define what kind of detectors 102 can detect in one location. Typically, locations require an accuracy from a detector 102 for the person to be located within that location. If the proper detector 102 is not used, that detector 102 generally cannot determine whether that person is within that location. In some embodiments, the system 100 could provide a certainty level, but does not guarantee that the person is located within that location.

In the shown embodiment, the detector 102 uses a WiFi system. The WiFi detector 102 can detect a location device 104 within a range of the WiFi detector 102. The coverage of the WiFi detector 102 can include an area as small as a single room or as large as many square miles. The signal propagated by the WiFi detector 102 typically becomes less certain or accurate after a certain range, otherwise known as a range of uncertainty 106. A location device 104 can be considered located if it is within the range of a WiFi base station which can generally be within a spherical radius of ninety meters. Alternatively a person can be located by an infrared detector 102 within a single room. Typical room materials are opaque to infrared radiation and so if a person's location device 104 is detected then they should be within the room.

While a WiFi detector 102 was described above, one skilled in the relevant art will appreciate that there are numerous other possibilities for providing location data to the system 100. In one embodiment, the location device 104 can be attached to a phone, cellular phone, personal digital assistant, or some other electronic device to detect the location of a person. In addition, light systems can detect the location of a person. Still yet, when a user logs into their computer, location data can be detected. Multiple variations can exist for detecting the location of a person. The location device 104 can include, but is not limited to, a wireless badge, a WiFi or Bluetooth device, an infrared badge etc.

Continuing with FIG. 1, each detector 102 can place a person within a range of locations. For example, the WiFi detector 102 can place a person's location within a general range of areas, but not in specific locations. In other embodiments, a GPS detector 102 can typically detect a person with more accuracy.

The location data received from a detector 102 can take many forms. For example, a GPS detector 102 can provide a geographic latitude and longitude with an elevation. This can be used in determining what floor a person is on within a building. For a WiFi detector 102, it can simply be the assertion that a user's transmitter is within range of a specific base station. A triangulated WiFi detector 102, can use the form of ranging information from a set of base stations, usually three or more.

Connected to detector 102 is a management device 108 for storing the location data. The management device 108 can include a single server or multiple servers receiving and transmitting location data typically through a network. One skilled in the art would appreciate that a network can include the Internet, an intranet network, a wide area network (WAN), a local area network (LAN), personal area network (PAN), wireless local area network (WLAN), and the like. Through the management device 108, the location data can be processed, stored, and accessed by multiple applications.

The management device 108 can place the location data into shared memory 110. Often, this can be done using a conventional publish/subscribe mechanism. On the management device 108, which can access the shared memory 110, a set of Location Type Policies 112 can use the received location data from the detector 102.

In typical embodiments, the Location Type Policies 112 can convert the location data into an instantiated location in the syntax of its Location Type as described above. To do so, the Location Type Policies 112 can make use of the Location Type Data 114. The Location Type Data 114 can include the location of the detector 102 within a building and the expected range of a signal. Furthermore, other Location Type Data 114 can include a person's location, activity, co-presence (i.e. current companions), business/social relationship with their current companions and other parameters which can be useful. The Location Type Data 114 can be in multiple forms; it can be an absolute position and range expressed numerically, or it can be a list of locations in which it is possible that the signal can be received.

Often, associated with the detectors 102 are potential error bounds on any specific location determination. For the WiFi example, an instantiated location cannot be more accurate than the expected range of the WiFi signal.

Figure 2:
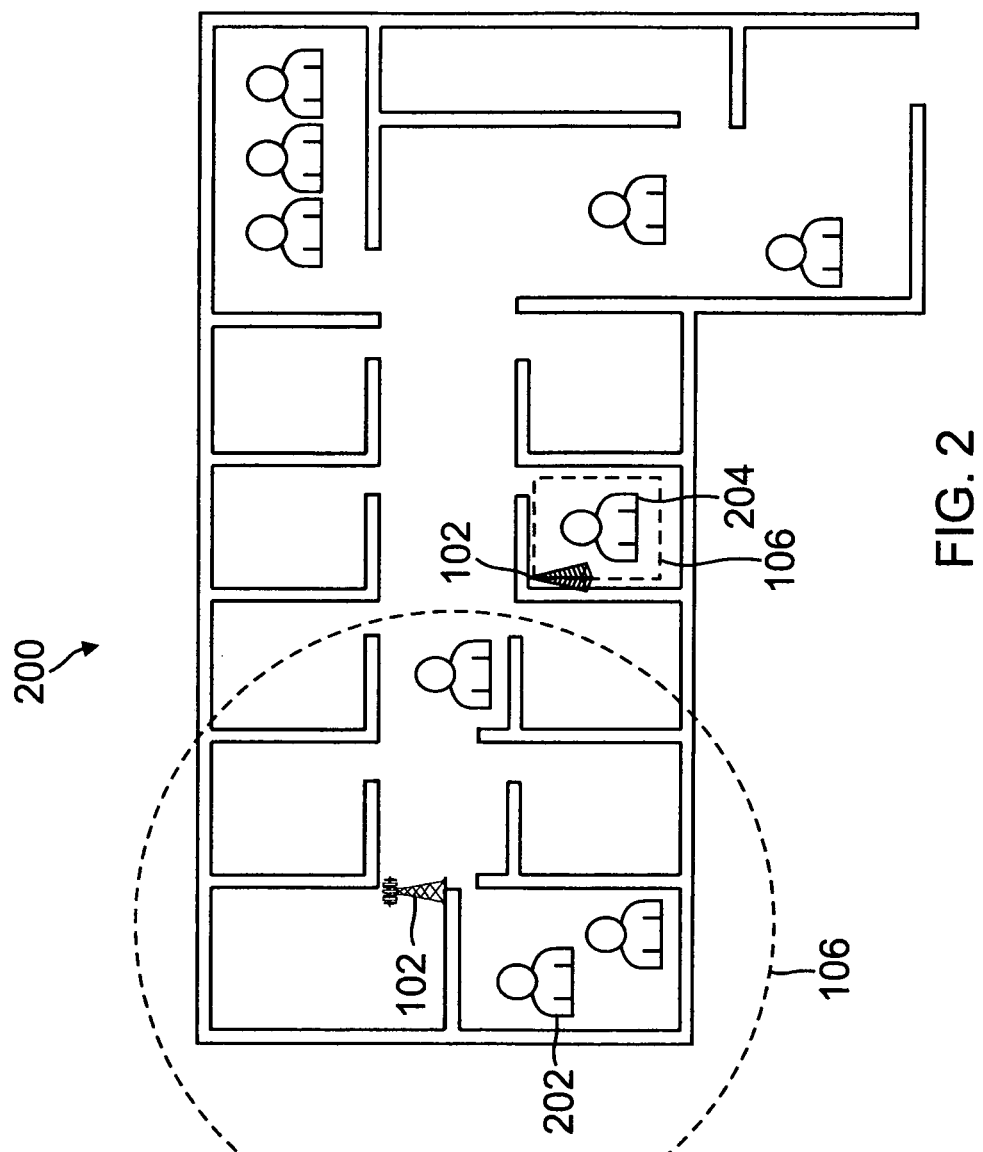
FIG. 2 provides a diagram exemplifying multiple detectors within typical locations of a building in accordance with one aspect of the present application.

FIG. 2 provides a system exemplifying multiple detectors 102 within typical locations of a building 200 in accordance with one aspect of the present application. For illustrative purposes, several people are shown encompassed within the building 200, including person 202 and person 204. Person 202 can be detected by a WiFi detector 102 within the range of uncertainty 106. The WiFi detector 102, as shown, can have a detection area of several rooms and outside of the building 200.

After receiving location data for person 202 from WiFi detector 102, a Location Type can be instantiated, such as a Political/Physical Location Type. As described above, the Political/Physical Location Type can include a hierarchy of locations ranging from a Country Subtype to a Room Subtype. Multiple locations can be instantiated that may or may not be a person's 202 location. Thus, person's 202 location can be described by a list of location instantiations.

Within FIG. 2, a detector 102 having a smaller range of uncertainty 106 is presented. As shown, the detector 102 can have an accuracy of a single room. In one embodiment, the detector 102 can take the form of an infrared detector. Alternatively, the detector 102 can track a person 204 logging into their computer or be a motion sensor. The detector 102 can incorporate numerous types of technologies that can detect a person 204 in a single room or small area. While having a small range of uncertainty 106, the accuracy of the detector 102 for person 204 is typically more accurate than the WiFi detector 102 for persons 202 or detectors that can cover a large range as described above. In some detectors 102, such as a GPS, additional parameters can be provided such as speed, elevation, etc. Through these parameters different types of Location Types can be instantiated.

After the Location Type is instantiated, system 100 generally places the instantiations on the shared memory 110. As will be shown below, many applications can use the instantiations.

Confidence Determinations

As described above, a user's location can be a list of instantiated Location Types and Subtypes as shown by the examples provided above. In addition, a determined level of confidence of a person's location can be attached to the Location Types and more particularly, the Subtypes. Referring to the WiFi detector 102 described above, and in particular person 202, the confidence determinations for a Political/Physical Location type can include the following:

---

<Political/Physical>
   <<Country>><<United States>><<Confidence>><<Certain>>
   <<City>><<New York City>><<Confidence>><< Certain >>
   <<District>><<Midtown Manhattan>><<Confidence>><< Certain >>
   <<Street>><<34$^{th}$ Street>><<Confidence>><< Certain >>
   <<Building>><<Empire State Building>><<Confidence>>
   << Certain >>
   <<Floor>><<56$^{th}$>><<Confidence>><< Certain >>
   <<Room>><<56123>><<Confidence>><<Possible>>

---

As shown in FIG. 2, the range of uncertainty 106 can place person 202 within a hallway, one of six rooms or outside the building. However, person 202 is unambiguously within the United States, New York City and the Empire State Building. Thus, the Location Type Polices 112 can annotate the location list for person 202 to indicate that these location Subtypes have been determined with certainty. In one embodiment, confidence determinations can use values such as "Certain," "Likely," "Unlikely," "Possible," etc. Alternatively, or in addition thereto, percentage values and ranges can be used, such as 80% to 94%.

Continuing the previous example, the Political/Physical Location Type builds upon the Location Type hierarchy disclosed earlier. If person 202 can unambiguously be placed in a Subtype of a certain extent then that person 202 can be placed unambiguously in Subtypes of a greater extent. In other words, and using the previous example, if person 202 is unambiguously in the Empire State Building Subtype, then that person 202 is unambiguously in the New York City Subtype and the United States Subtype. Furthermore, if there is ambiguity in the person's 202 location in a Subtype, then this can be propagated to Subtypes of a lesser extent. So the confidence that person 202 can be placed in a room is shared among the rooms and hallway that person 202 can be possibly in.

In the previous example, a person 202 was detected by a WiFi detector 102. Generally, WiFi detectors 102 cannot detect a person with a resolution less than a floor of a building 200. Nonetheless, Location Type Policies 112 can be used to further determine the likelihood of a person 202 being in any one of the instantiated room Subtypes in the location list. One skilled in the relevant art will appreciate that this can be performed in a number of different ways and can make use of data stored in the Location Type Data 114.

In one embodiment, the determination can be performed using a relative area of each room to the total area of the floor plan in which a person 202 was detected. As a result, the larger a room on the floor, the more likely that a person 202 can be located in that room. This can be pre-calculated for each detector 102 and kept in the Location Type Data 114 or it can be calculated from raw floor data each time.

Using the confidence and accuracy concepts described above, a person's location can be a list of one or more instantiated Location Types with each instantiated Subtype being provided with a confidence value or declaration. For example, a person 202 can be associated with a Political/Physical Location Type, an Enterprise Location Type, or User/Social Location Type, to name a few.

Figure 3:
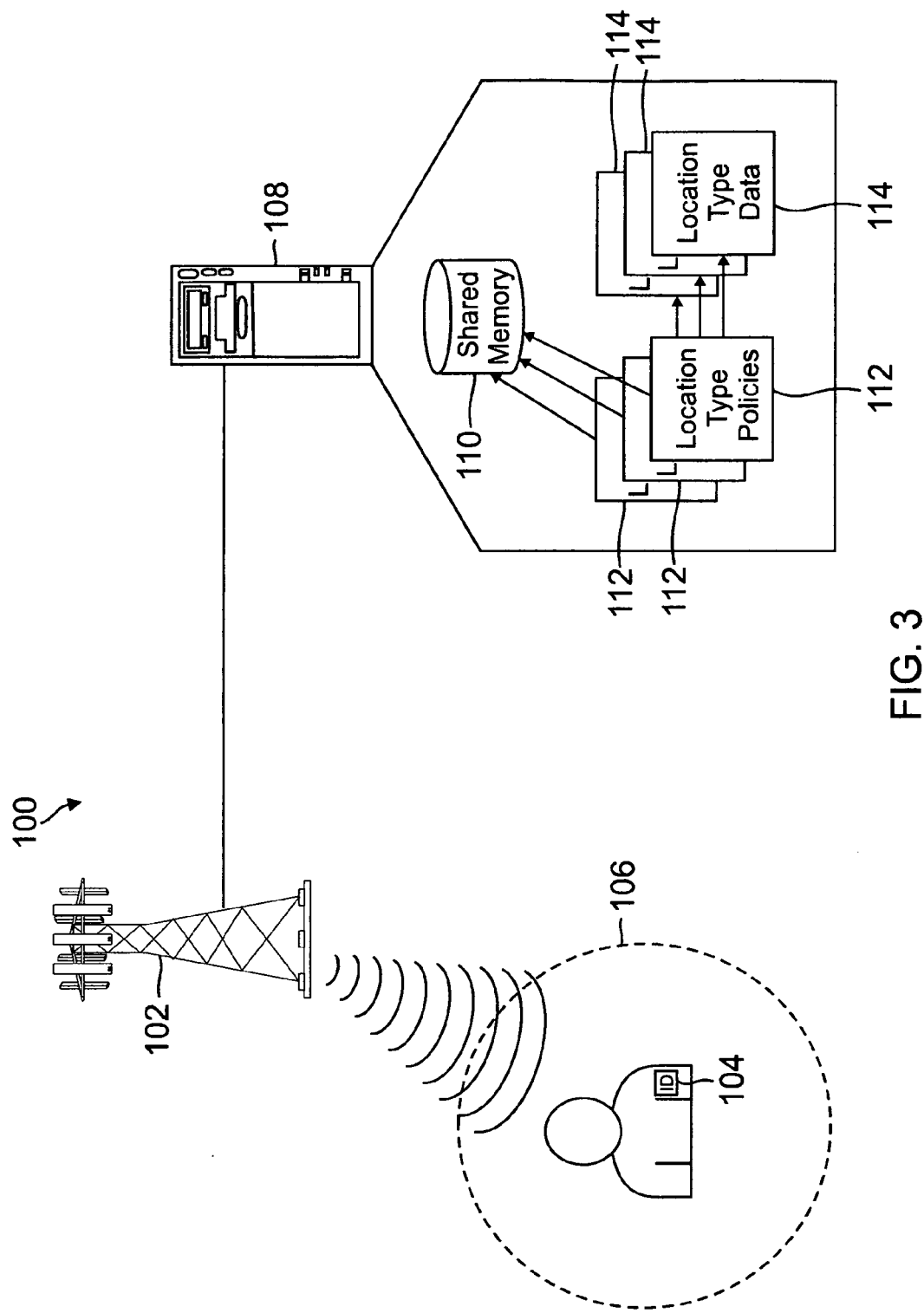
FIG. 3 illustrates interactions between multiple location types to derive exemplary location information about a person in accordance with one aspect of the present application.

With reference now to FIG. 3, interactions between multiple Location Types found in shared memory 110 to derive location approximations for a person is presented in accordance with one aspect of the present application. As shown above, a Political/Physical Location Type was derived from location data. In addition, the Enterprise Location Type and User Location Type can similarly be derived from the location data.

Often, however, system 100 can provide a more efficient way for instantiating Location Types by using the information within other Location Types. Location Type Policies 112 can be made aware of other Location Types. For example, and as shown in FIG. 3, if the Physical/Political Location Type Policies 112 place a person in a single room with high confidence, the Enterprise Location Type Policies 112 can take this Location Type along with those confidence determinations within the Physical/Political Location Type and couple it with data about the Enterprise Location Type and its Location Type Data 114 to place that person in an office. Similarly, the User/Social Location Type can use the Location Type Policies 112 and data from its Location Type Data 114 to place the person in their own office with a degree of confidence that is derived from the confidence of the other Location Types.

As illustrated above, confidences in Location Types can be derived from confidence determinations in other Location Types. Location Type Policies 112 can use knowledge taken from their Location Type Data 114 to improve these confidence determinations. In one example, the Physical/Political Location Type Policies 112 can place a person in one of six rooms. However, if the Enterprise Location Type Policies 112 include Location Type Data 114 that indicates that one of these rooms is a utility room that is off limits to certain personnel, then the system 100 can sharpen the confidence determinations that have been provided by the Physical/Political Location Type.

In a related example, if the User/Social Location Type Policies 112 are aware that the person is a female and one of the rooms is a male dressing room for the Enterprise Location Type, then the confidence determinations can be further sharpened. More specific Location Type Polices 112 can also be provided. For example, a user is more likely to be in their own office than that of a colleague. Confidence determinations in the User/Social Location Type can be further sharpened by putting less confidence in a user being in a colleague's office than in their own office. These confidence refinement policies can also be used with a user's calendar.

Degradation of Confidence Determinations

Returning to FIG. 2, a person 204 can be detected by a detector 102 with the accuracy of a single room indicated by the range of uncertainty 106. This is shown with an infrared sensor but it could have also been provided using data from a hot desking telephony feature in which a user can login with identifying information and take ownership of the telephone. The location data indicated that the person 204 was within the single room with a confidence level of certainty. Often, as time passes, the credibility of the confidence determination can degrade as a time-based function. After a period of several hours, the credibility given to such a declaration can be very low.

Recent determinations can be given a high credibility as to their confidence determination, while older determinations can be given a low confidence determination. Typically, the degradation of confidence can be used with technologies that do not periodically determine whether a person has left the area. Rather, degrading confidence determinations can work with technologies such as phone lines and computer docking stations. The syntaxes and semantics for each of the Location Types can usefully take into account the degradation of confidence determinations.

Figure 4:
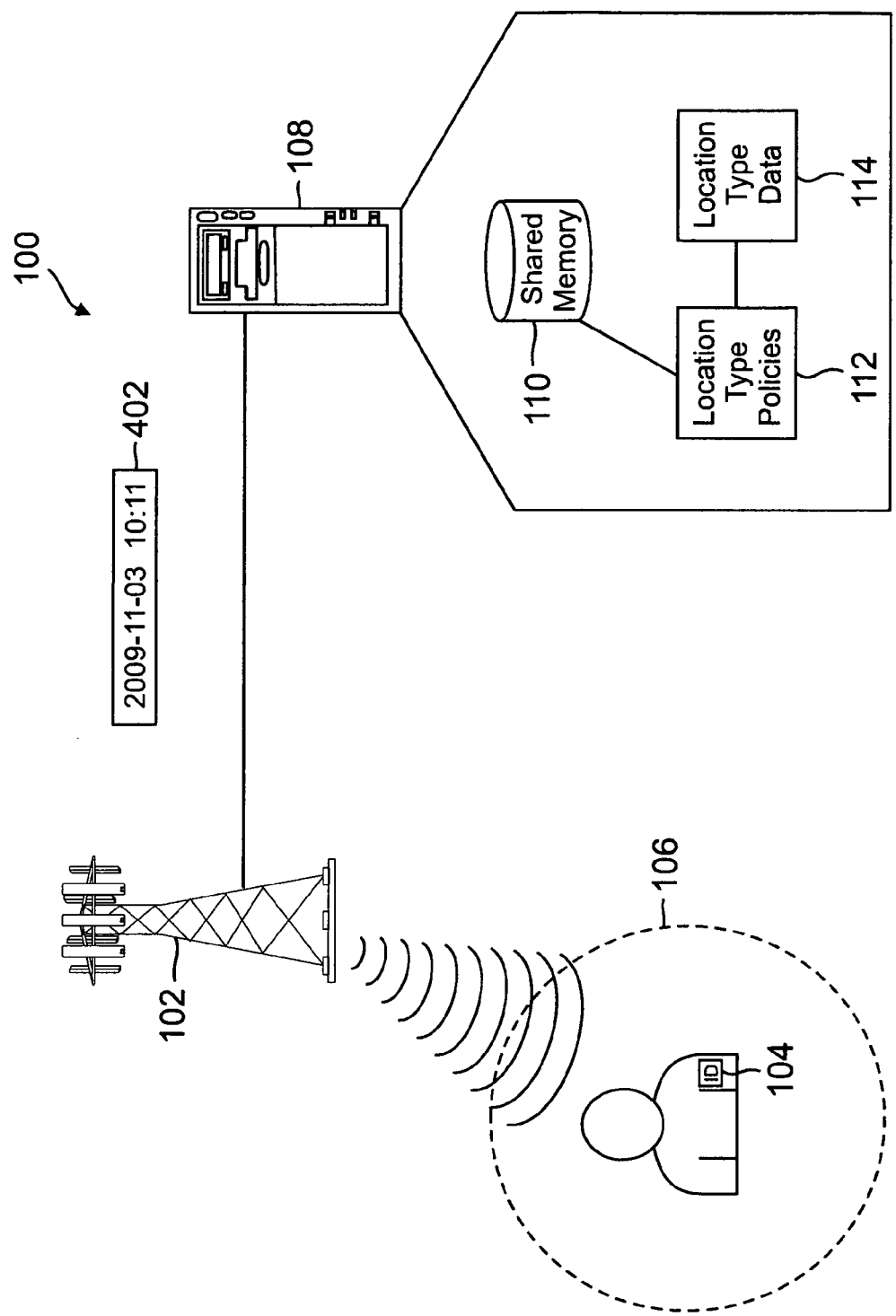
FIG. 4 shows an illustrative block diagram for degrading the confidence of location data received from an exemplary detection system in accordance with one aspect of the present application.

With reference now to FIG. 4, confidence determinations can be degraded in a variety of ways. In one embodiment, the Location Type Policies 112 for a detector 102 can periodically apply a suitable degradation function and update the confidence determination with new values. Alternatively, the Location Type Policies 112 can extend their syntax by adding a tag 402 indicating when the location data was taken. The degradation of confidence can then be performed by other applications. These applications can apply their own degradation functions that can be more useful for their specific purposes. An example of the syntax for a Political/Physical Location Type is shown below:

```
<Political/Physical>
    <<Date>><<2009-11-03>><<Time>><<10:11>>
    <<Country>><<United States>><<Confidence>><<Certain>>
    <<City>><<New York City>><<Confidence>><< Certain >>
    <<District>><<Midtown Manhattan>><<Confidence>><< Certain >>
    <<Street>><<34th Street>><<Confidence>><< Certain >>
    <<Building>><<Empire State Building>><<Confidence>>
    << Certain >>
    <<Floor>><<56th>><<Confidence>><< Certain >>
    <<Room>><<56123>><<Confidence>><<Possible>>
```

Using the tag 402 above, several ways can be used to degrade the confidence determinations for the Subtypes of the Political/Physical Location Type. In one embodiment, a suitable time-based degradation function can be used to degrade the confidence determinations periodically after its last valid location determination. Continuing with the hot desking example provided above, this degradation can begin immediately after the hot desking feature is exercised by the user. This embodiment takes into account that the person can have quickly left the room after a brief call. In the case of the WiFi determination, however, the WiFi detector 102 can know that the location device 104 or person is within range. Generally, and from the examples provided above, the degradation function does not take effect until the detector 102 loses contact with the person. Often, the location and confidence determinations by the detector 102 can still be valid for a period of time. Even though the person has left the detection area indicated by the range of uncertainty 106, it can still be declared, with confidence, for a time that the person is still within the Empire State Building, and for longer times that the person is within New York City and the United States. The same is also true for the person using the hot desking. Thus, in some embodiments, the use of a confidence declaration with some method of indicating degradation can provide useful location information for extended periods of time.

Conflicts in Degraded Data

Often, there can be instances in which conflicts in Location Types, Subtypes, and confidence determinations occur. For example, when a person leaves the office and returns to their home, detectors 102 at the office can indicate that their location is at the office, but with degraded confidence. When the person arrives at home, the detectors 102 can indicate that they are at home as well. A Location Selector function, in the system 100 or application, can use the date and time of day indication to select among these conflicting locations. Locations derived from more recent location determinations can be preferred. Locations that conflict with more recent location determinations can be discounted.

In some embodiments, confidence degradation can be avoided if the degradation capability is not implemented. In these embodiments, detectors 102 could provide periodic determinations.

Unknown Location

Continuing with the example provided above, in some instances, a person's location is not known. If no detector 102 can provide a location for a user, then specific policies can be activated. Generally, there can be preferences set up if the person cannot be located at home or at the office or any other location.

Figure 5:
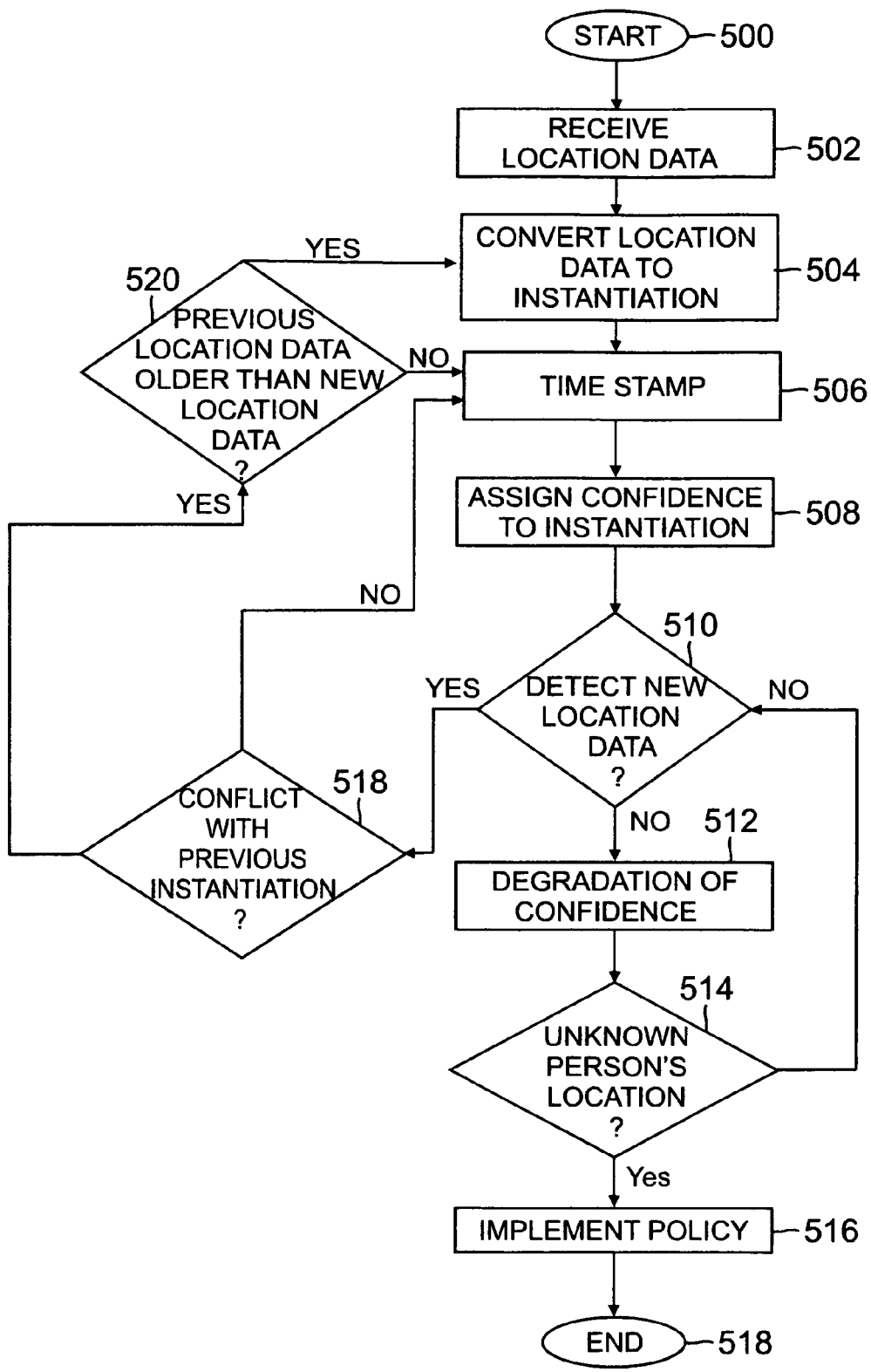
FIG. 5 diagrams an exemplary flow chart providing processes for degrading the confidence value of location data as well as handling conflicting information from multiple sensors in accordance with one aspect of the present application.

FIG. 5 diagrams an exemplary flow chart providing processes for degrading the confidence determinations of location data as well as handling conflicting information from multiple detectors 102 in accordance with one aspect of the present application. The exemplary processes provided herein are for illustrative purposes and should not be construed as limiting to the scope of the present application.

The process begins at block 500. At block 502, a detector 102 can receive location data. The location data typically comes from either a location device 104 or a person that is detected by the detector 102, or a combination thereof. The location data is then converted to a Location Type instantiation at block 504. Dependent on the type of location that the detector 102 is at, different Location Types can be instantiated. For example, if the location data is detected within a building, the Political/Physical Location Type can be used. In another example, an Enterprise Location Type can be instantiated when the person is detected on a university's campus.

Continuing with FIG. 5, a time stamp or tag 402 can be inserted into the instantiated Location Type at block 506. The tag 402 can indicate a date and time the location data was received by the detector 102. As shown, the tag 402 can allow for the degradation of a confidence determination for the location data received.

At block 508, confidence determinations are applied to the instantiated Location Types. Generally, these determinations are applied to the Subtypes of the instantiated Location Type. In one embodiment, the Subtypes can include values of "Certain," "Likely," "Unlikely," "Possible," etc. Alternatively or in addition thereto, percentage values can be used, such as 80% to 94%.

At decision block 510, the system 100 determines whether any new location data is received by detector 102. Often this is a result of a periodic update by the detector 102. If no update is available by the detector 102, the system 100 or application degrades the confidence determination for the Location Type and its Subtypes. Typically, a time-based function is used based on the tag 402 associated with the Location Type. In other embodiments, the confidence determinations can be degraded based on specific information related to the detected person.

At decision block 514, system 100 can determine whether a person's location is unknown. At this point, the Location Types confidence determinations have become uncertain, often as a result of a prolonged period of time passing. In the previous examples, this could occur when the person is neither located at their house nor their office. If the person's location is unknown, then a policy is implemented at block 516. This policy can include set all Location Types to unknown or uncertain. The process then ends at block 518.

Returning to decision block 514, the process returns to decision block 510 when the person's location is still known. Often this is a result of the confidence determination not falling below a threshold value.

At decision block 510, and when new location data from the detector 102 has been received, the system continues with decision block 518. At decision block 518 the system 100 or application determines whether there is a conflict with a previous instantiation. As described earlier, this can occur when the person moves from their office to their home. When no conflict is reported, the processes continue at block 506. Otherwise, the process goes to decision block 520.

At decision block 520, the system 100 determines whether the previous location data is older than the new location data. When it is, the process returns to block 504. Otherwise, the process returns to block 506.

Multiple Sensors and Location Selection

Figure 6:
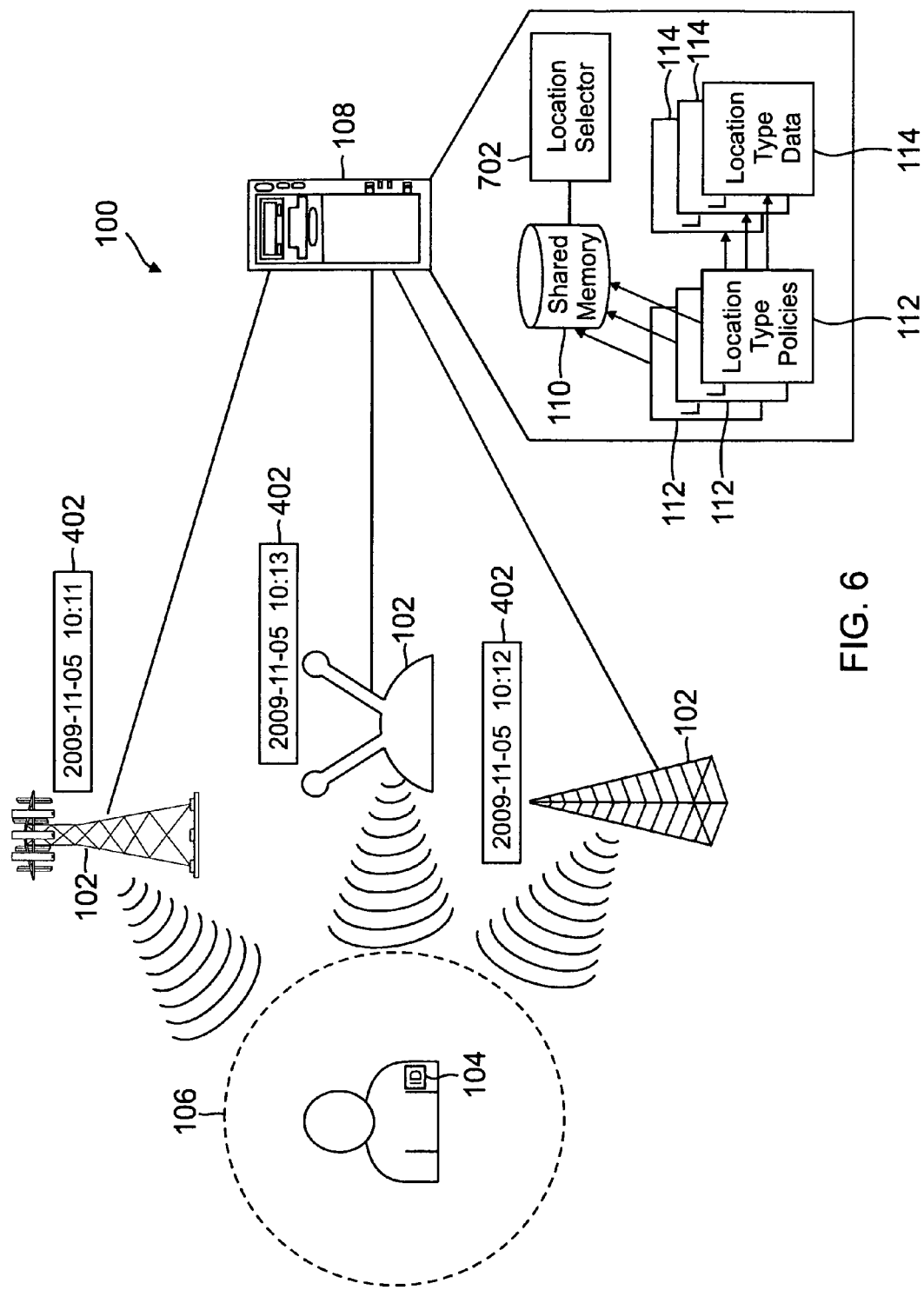
FIG. 6 shows a pictorial representation of multiple illustrative sensors detecting a person and consolidating the location in accordance with one aspect of the present application.

FIG. 6 shows a pictorial representation of multiple illustrative detectors 102 detecting a person and consolidating the location in accordance with one aspect of the present application. As described above, locations can be provided in the syntaxes of multiple interaction spaces, called Location Types. Location data can be propagated by semantics, possibly policy-based, between multiple interaction spaces. The examples of Physical/Political Location Type, Enterprise Location Type, and User/Social Location Type have been provided for. However, these are examples and other Location Types can be created as needed, e.g. an interaction space for collaboration groups.

In typical embodiments, confidence and degradation of confidence features can be associated with the Location Types. Uncertainties in Location Types can be captured within the syntaxes of multiple interaction spaces. It has been shown how this confidence declaration can be propagated between interaction space syntaxes and how evidence within an interaction space can be use to sharpen or otherwise adjust these confidence declarations.

The features provided above overcome the deficiencies previously described. In particular, the system 100 and applications capture the inherent uncertainties within detectors 102. Multiple mutually ambiguous location determinations can be considered, which will now be described with respect to FIG. 6.

Generally described, location data can be ambiguous. The inherent uncertainty in a location measurement can span different values in a Location Type Subtype. For example, a user can be specified as being in their own office at the same time as he or she being in a meeting room.

As shown in FIG. 6, there may be multiple detectors 102 within the location outlined by the range of uncertainty 106. The location data from the multiple detectors 102 can be propagated into the syntaxes of the Location Types of multiple interaction spaces instantiating multiple Location Type Policies 112 and Location Type Data 114. In essence, the multiple detectors 102 can each provide location lists for a single person and these lists can be in multiple Location Types.

Ambiguities can be resolved through the Location Selector 702 shown within FIG. 6. Generally, the confidence determinations in each Location Type can provide a basis for preferring one over another. For example, a location can be preferred if it has the highest confidence in the Location Type Subtype of the smallest extent.

In other embodiments, applications using the information can each have their own need for location determinations. Often, it can be of more utility to provide aspects of the Location Selector 702 within the application. In one example, a person can have policies that can operate differently if they are in the office or at home.

In typical embodiments of the present application, the Location Selector 702 can provide an application protocol interface (API) so that external applications can request location data of a certain Location Type and Subtype. In one illustration, an application can request location data of a certain Subtype or from a certain detector 102 or class of detectors 102. This can be provided with an indication of degradation in either the clock or the degraded confidence determination. The application can then use its own way to select the most suitable location.

Figure 7:
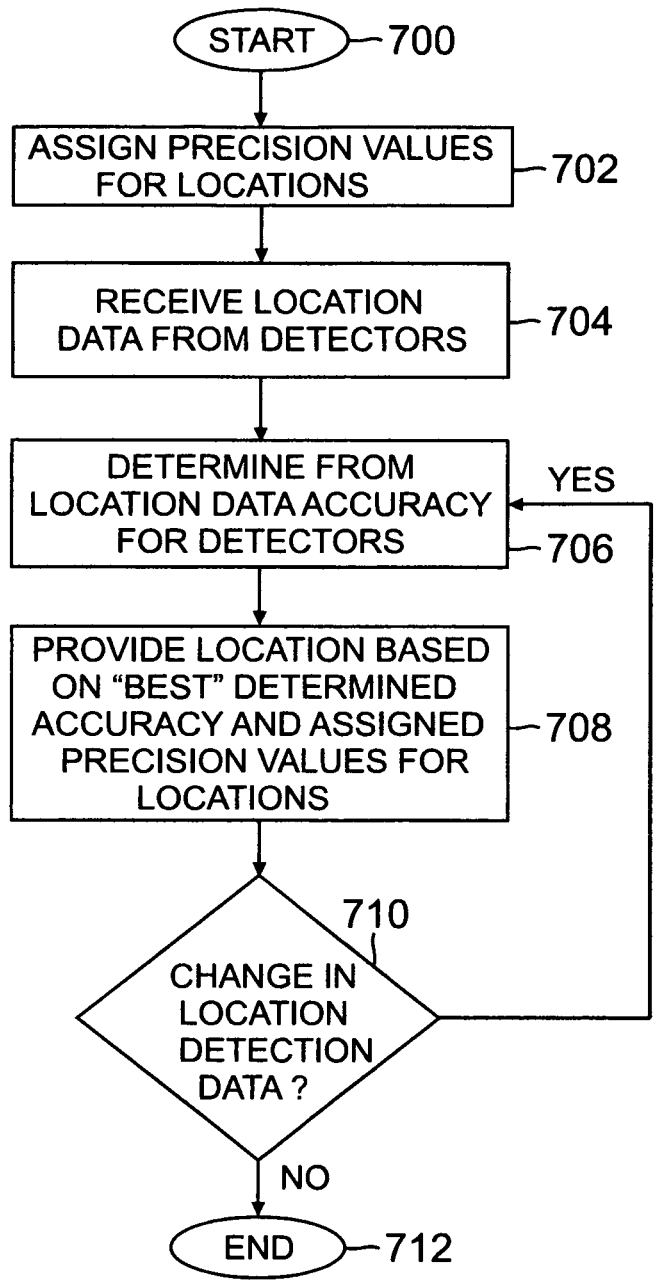
FIG. 7 is a flow chart providing illustrative processes for approximating a location of a person based on the multiple sensors in accordance with one aspect of the present application.

FIG. 7 is a flow chart providing an illustrative process for approximating a location of a person based on the multiple detectors 102 in accordance with one aspect of the present application. The process can begin at block 700. At block 702, the system 100 can assign precision values for each of the locations. The precision values can be associated with the level of accuracy required from a detector 102 to detect a person within that particular location. For example, a room location can have a higher precision value than a building.

At block 704, location detection data is received from detectors 102, and in this embodiment, several detectors 102. The precision for the detectors 102 is then determined from the location data received from the detectors 102 at block 706. Continuing with the examples provided above, a WiFi detector 102 can have a very low level of precision meaning that the accuracy of the WiFi detector 102 would be able to locate a person within a building and not within a room. On the other hand, a GPS detector 102 could have a high level of precision pinpointing a person within a specific room and floor.

At block 708, the system 100 can provide a location based on the best determined precision and assigned precision values for the location. Matching the best accuracy from the detectors 102 to the location with the highest precision level, the system 100 can determine where the person is based on the detector 102 having the best accuracy.

At decision block 710, system 100 can determine whether there is a change in location data. This can occur when the "best" detector 102 described above can no longer locate the person. In the alternative, a new detector 102 could have detected the location of the person within its range. Typically, the system 100 can update its information if any new location data is received. If there has been a change in location data, the processes return to block 306. Otherwise, the processes end at block 712.

Applications

Figure 8:
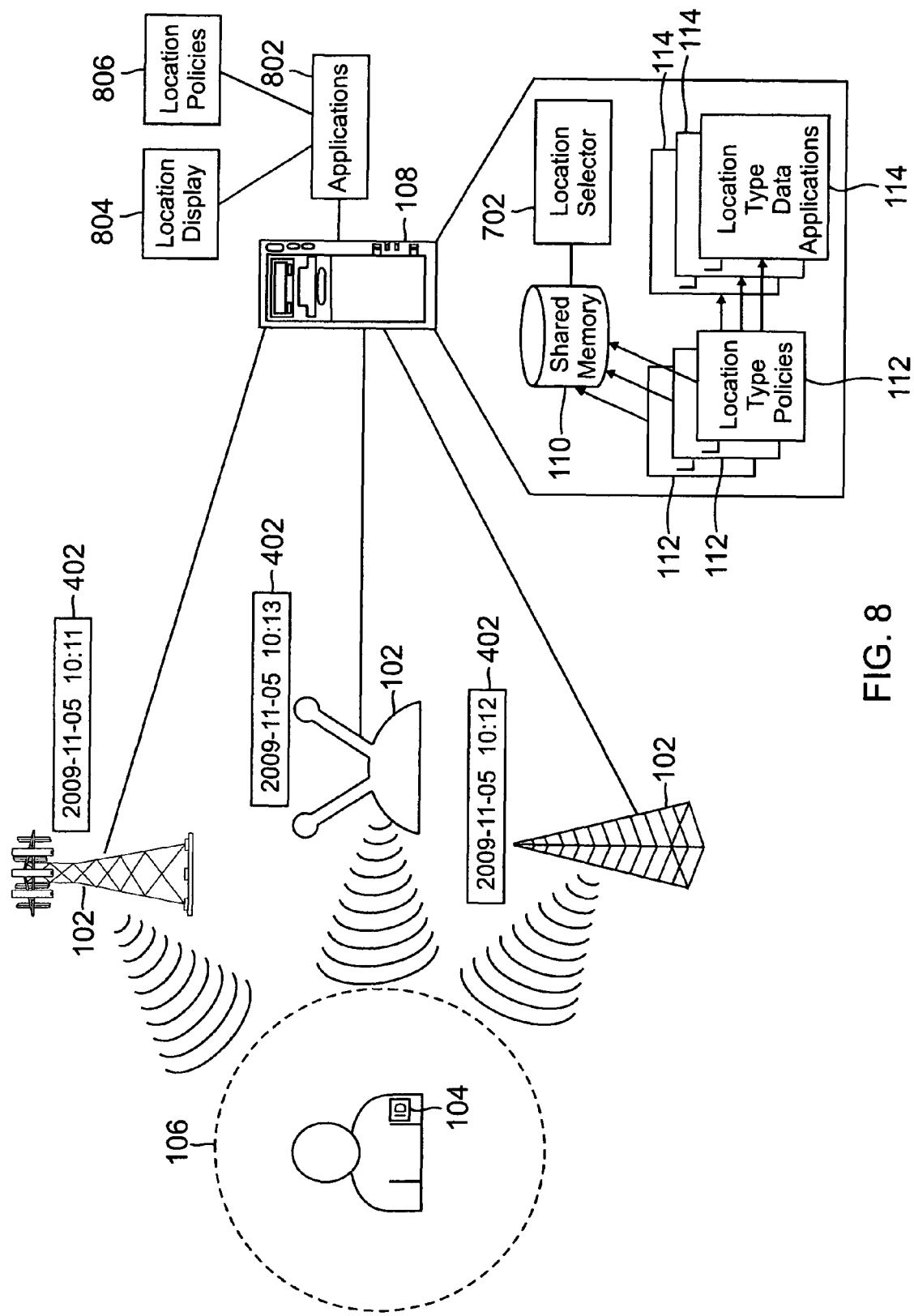
FIG. 8 provides exemplary applications that can use the approximations in accordance with one aspect of the present application.

FIG. 8 provides exemplary applications 802 that can use information from the Location Selector 702 in accordance with one aspect of the present application. In typical embodiments, the applications 802 can utilize degraded confidence declarations. In some embodiments, policies could be triggered if a person's location confidence determination is below a certain threshold level. The system 100 can provide a stand alone web service or something similar through a LAN or wider network. It can also be closely integrated into larger applications 802.

The location data can be maintained in shared memory 110 and made available through an API for use by other applications 802. The service can be provided on a local network or made available across the Internet. It can function as a web service that makes itself and its location data available on demand to other applications 802. The location service can also be integrated directly into a larger application 802.

As shown within FIG. 8, the applications 802, can include, but is not limited to, to two basic types of applications: a location display 804 and a location policy 806. The location display 804 can indicate an ambiguous user location with the associated confidence declaration. It is known to one skilled in the relevant art to show a person's location on a plan. To show uncertainty, a person's location could be shown by the shading of the rooms or other locations that they could possibly be in. The uncertainty could be indicated by the hue and/or intensity of the color used for shading.

Other applications 802 can include location policies 806 to provide for behavior. The uncertainty found for a person's location can be used as an indication to these policies. Some behaviors could be taken if there is a high degree of confidence in the person's location while others can require only a low degree. A policy that turns on the office lights when a person in their office's vicinity uses only a low confidence in location determination. Policies that can change the person's call forwarding sensing can result in lost calls. Therefore these use a significantly higher degree of confidence. The use of confidence thus facilitates the acceptance of such policies since it allows them to be tuned to the implications of their activity.

Typically, policies using location can be of two types. One is a policy that can control a behavior i.e. forward a user's call to their current location. The other can be meta-policies that control the behavior of other policies. For example, a meta-policy could indicate that a person's wireless telephone should not be rung if there is likely or a greater confidence that they are in a meeting room.

The location policies 806 should not be construed as limiting for a single person, but instead can incorporate many people. Applications 802 could also combine location data for multiple people. This for example could be used to detect groups of people. In a similar way, the policies could use data from other services. For example, if a group of people are detected in a meeting room, their calendars could be consulted to determine if this is a scheduled meeting. Data about the purpose and length of the meeting could be used to control other communication and collaboration features. It could be used by a presence and availability service to determine that a person is at a meeting and to determine that they will not be available for the duration of the meeting.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for managing location information comprising:
    assigning a precision level to at least one location, the precision level comprising an expected accuracy level associated with a detector in said at least one location;
    receiving location data from said detector, wherein said location data includes an actual accuracy level associated with said detector; and
    setting location information associated with a detectable item within said at least one location to uncertain when said precision level for said at least one location is greater than said actual accuracy level associated with said detector.

2. The method of claim 1, wherein the method further comprises setting said location information to certain when said precision level for said at least one location is lower than or equal to said actual accuracy level of said detector.

3. The method of claim 1, wherein said at least one location is a general location, said general location assigned a low precision level.

4. The method of claim 1, wherein said at least one location is a specific location, said specific location assigned a high precision level.

5. The method of claim 1, wherein said detector is a wireless fidelity (WiFi) detector.

6. The method of claim 1, wherein said detector is a global positioning system.

7. A management and collaboration system comprising:
    a database for storing a location type, wherein said location type includes a hierarchy of subtypes based on precision levels of said subtypes, said subtypes having confidence determinations and the precision levels comprising an expected accuracy level associated with a detector within a location;
    at least one processor;
    a memory operatively coupled to the processor, the memory storing program instructions that when executed by the processor, cause the processor to:
        receive, from said detector, location data of a detectable item within the range of said detector, said location data including an actual accuracy level of said detector;
        for said subtypes having higher precision levels than said actual accuracy level of said detector, set said confidence determinations for said subtypes to uncertainty and set said confidence determinations of said subtypes having lower precision levels than the actual accuracy level of said detector to certainty.

8. The system of claim 7, wherein said subtypes comprise key/value pairs.

9. The system of claim 8, wherein a value of said key/value pairs is restricted.

10. The system of claim 7, wherein said location type is a physical location type, said physical location type having a hierarchy of subtypes selected from the group consisting of a country subtype, a city subtype, a district subtype, a street subtype, a building subtype, a floor subtype, a room subtype, and a combination thereof.

11. The system of claim 10, wherein said room subtype comprises a male dressing room or a female dressing room.

12. The system of claim 7, wherein said location type is an enterprise location type, said enterprise location type having a hierarchy of subtypes selected from the group consisting of a premises subtype, a campus subtype, a building subtype, a room subtype, and a combination thereof.

13. The system of claim 7, wherein said location type is a user location type, said user location type having a hierarchy of subtypes selected from the group consisting of a venue subtype, a building subtype, a room subtype, and a combination thereof.

14. The system of claim 13, wherein said venue subtype comprises a work venue or home venue.

15. The system of claim 7, wherein said certainty and said uncertainty are percentages.

* * * * *